United States Patent [19]

Papetti

[11] Patent Number: 5,323,913

[45] Date of Patent: Jun. 28, 1994

[54] PRESSURE SCREENING APPARATUS WITH BAFFLE

[75] Inventor: Richard R. Papetti, North Easton, Mass.

[73] Assignee: Bird Escher Wyss Inc., Mansfield, Mass.

[21] Appl. No.: 986,971

[22] Filed: Dec. 8, 1992

[51] Int. Cl.$^5$ .............................................. B07B 1/20
[52] U.S. Cl. ................................................... 209/273
[58] Field of Search ................. 209/17, 273, 306, 211, 209/500, 501, 250; 210/413, 414, 415, 512.3

[56] References Cited

U.S. PATENT DOCUMENTS

| | | | |
|---|---|---|---|
| 2,992,740 | 7/1961 | Phippen | 209/17 X |
| 3,899,414 | 8/1975 | Hansen | 209/17 |
| 3,933,649 | 1/1976 | Ahlfors | 209/273 X |
| 3,942,728 | 3/1976 | Christ et al. | |
| 3,964,996 | 6/1976 | Holz et al. | 209/17 |
| 4,202,761 | 5/1980 | Holz | 209/273 X |
| 4,216,918 | 8/1980 | Kahmann et al. | 209/17 X |
| 4,267,035 | 5/1981 | Martin | 209/273 |
| 4,634,521 | 1/1987 | Simola et al. | 209/17 |
| 4,710,284 | 12/1987 | Amit | 209/17 |
| 4,710,287 | 12/1987 | Henrich et al. | 209/306 X |
| 4,749,474 | 6/1988 | Young | 209/273 |
| 4,851,111 | 7/1989 | Martin et al. | 209/17 X |
| 5,078,859 | 1/1992 | Satomi | 209/17 |
| 5,102,532 | 4/1992 | Hautala et al. | 209/273 |
| 5,172,813 | 12/1992 | Ljokkoi | 209/273 X |
| 5,176,261 | 1/1993 | Holz | 209/273 |

FOREIGN PATENT DOCUMENTS

| | | |
|---|---|---|
| 1059357 | 7/1979 | Canada . |
| 1059358 | 7/1979 | Canada . |
| 3116693 | 4/1981 | Fed. Rep. of Germany . |

*Primary Examiner*—D. Glenn Dayoan
*Attorney, Agent, or Firm*—Fish & Richardson

[57] ABSTRACT

A screening apparatus for separating acceptable and rejectable material from a pressurized stream of fluid pulp is provided. The screening apparatus includes a housing with a chamber having a geometry conducive for deflecting air and light materials radially away from an axis of rotation and to peripheral regions of the housing. The chamber is disposed at one end of the housing and has a dimension defined by an axial spacing between the housing and an end portion of a screen basket, the axial spacing along the axis of rotation increasing with increasing radius relative to the axis of rotation. Deflecting the air and light material away from the axis of rotation improves the separation of acceptable and rejectable materials from the fluid pulp and reduces wear of the internal components of the screening apparatus.

10 Claims, 5 Drawing Sheets

PRESSURE SCREENING APPARATUS WITH BAFFLE

BACKGROUND OF THE INVENTION

This invention relates to screening apparatus as encountered in the pulp and paper industry. The screening apparatus separates rejectable material from acceptable material when both are in a liquid suspension.

In the papermaking process, a screening apparatus is typically used to separate foreign material from a fluid pulp. For example, a screening apparatus for recycling paper materials, is often fed material having non-recyclable materials, (e.g. plastics, foams, self-stick adhesives) which are all required to be separated from the recyclable paper.

A typical screening apparatus includes a housing within which a screen basket is mounted around a concentrically positioned rotor assembly. The screen basket is usually made from a relatively thin metal plate material having openings sized to screen the non-recyclable materials. When mounted in a screening apparatus, the screen basket provides a barrier between a screening chamber and an accept chamber. Fluid pulp is introduced to the screening chamber by way of a feed inlet which is typically at the screening chamber. Material unable to pass through the screen basket flows to an end of the screening chamber away from the feed inlet and is removed through a reject outlet. Acceptable material passing through the screen basket to the accept chamber moves on to the accept outlet for further processing.

The rotor assembly generally includes pulse elements such as, hydrofoils or a drum cylinder having a contoured surface, mounted on a rotating shaft and in close proximity to the screen basket to sweep past the openings of the screen basket. The pulse elements may be positioned on either the feed or accept side of the screen basket. The rotating pulse elements generate hydrodynamic pulses in the radial direction with enough force and frequency to continuously remove any fiber plugs that occur in the screen basket openings.

In operation, fluid pulp introduced under pressure to the feed inlet circulates along the outer radial portion of the screen apparatus housing. A spinning action is imparted to the circulating fluid pulp by the rotational motion of the rotor assembly such that materials with low specific gravity accumulate along the axis of rotation of the rotor assembly and materials of higher specific gravity move to outer radial portions of the housing. One type of screening apparatus includes an air bleed placed along the axis of rotation and within the feed chamber so that air and light materials amassed at the axis of rotation can be removed.

SUMMARY OF THE INVENTION

In general, the invention features a screening apparatus for separating acceptable and rejectable material from a pressurized stream of fluid pulp. The screening apparatus includes a housing with a chamber having a geometry conducive to deflect air and light materials radially away from an axis of rotation and to peripheral regions of the housing. The chamber is proximate to an end portion of a screen basket and provides a fluid pulp path from an inlet of the chamber to an outlet of the chamber having an axial spacing along the axis of rotation that increases with increasing radius relative to the axis of rotation.

With this arrangement air and light materials are forced to outer portions of the chamber where the velocity of the fluid pulp is greater so that the air and light material can be mixed with the main body of flow. Forcing the air and light material away from the axis of rotation and towards the main body of fluid exiting the chamber reduces wear of the internal components of the screening apparatus, such as the screen basket and rotor assembly. The geometry of the chamber also eliminates the need for air bleed outlets which often become blocked due to their small diameters, which are typically kept small to prevent significant loss of acceptable fluid pulp. Because the arrangement reduces the accumulation of light rejectable materials within the screening apparatus, operation of the screening apparatus can continue for longer periods of time without the need to stop operation for periodic cleaning.

Preferred embodiments of the invention include the following features. The axial spacing along the machine axis progressively increases with increasing radius. The chamber is defined by an end portion of the housing and the end portion of the screen basket, either of which may have a hemispherical or conical shape with an apex being in the vicinity of the axis of rotation. The end portion of the housing includes a baffle. The chamber may be any one of either a feed, accept or reject chamber.

DESCRIPTION OF THE PREFERRED EMBODIMENTS

Figure 1:
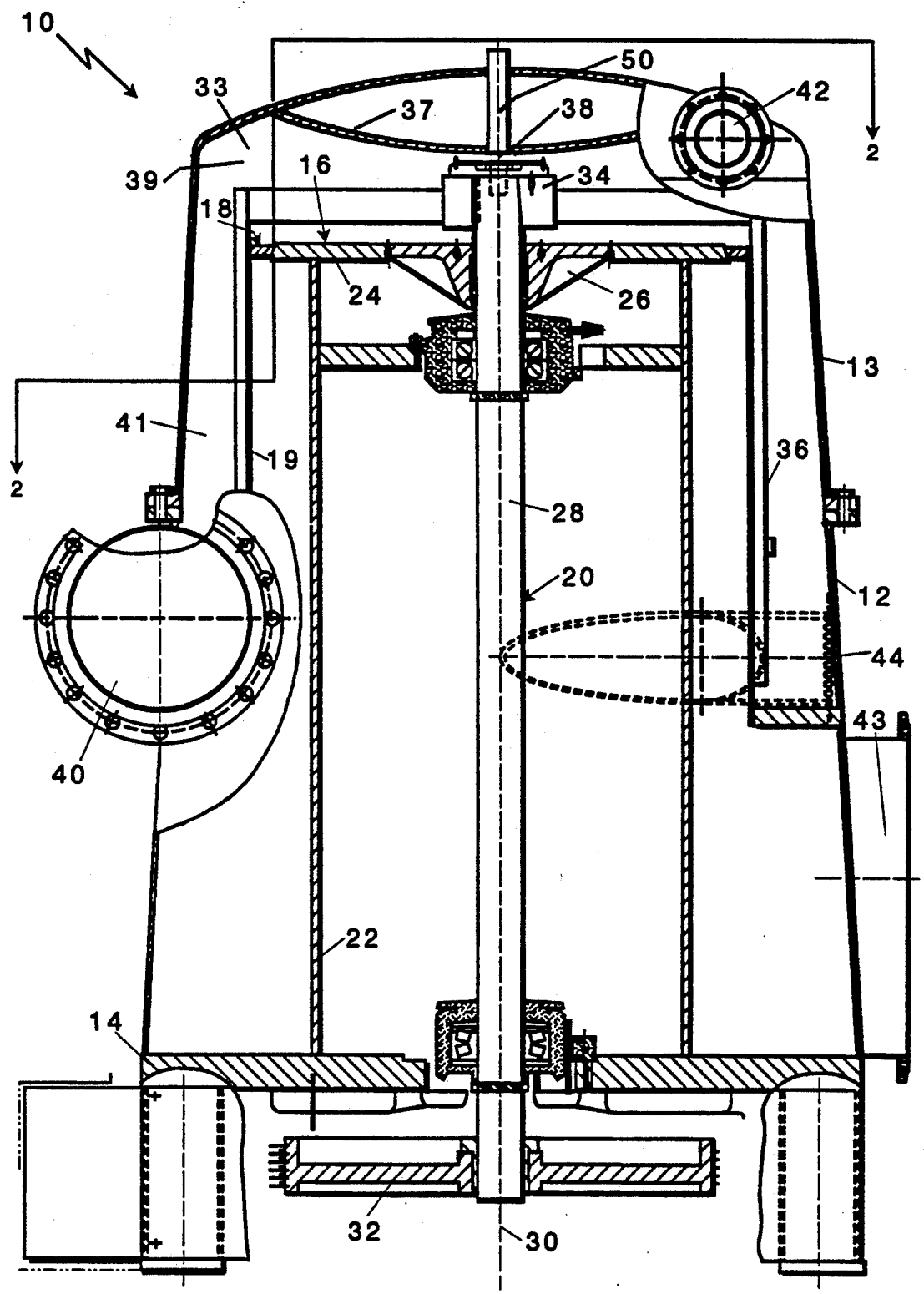
FIG. 1 is a cross-sectional side view of a screen apparatus having a baffle according to the invention.
Figure 2:
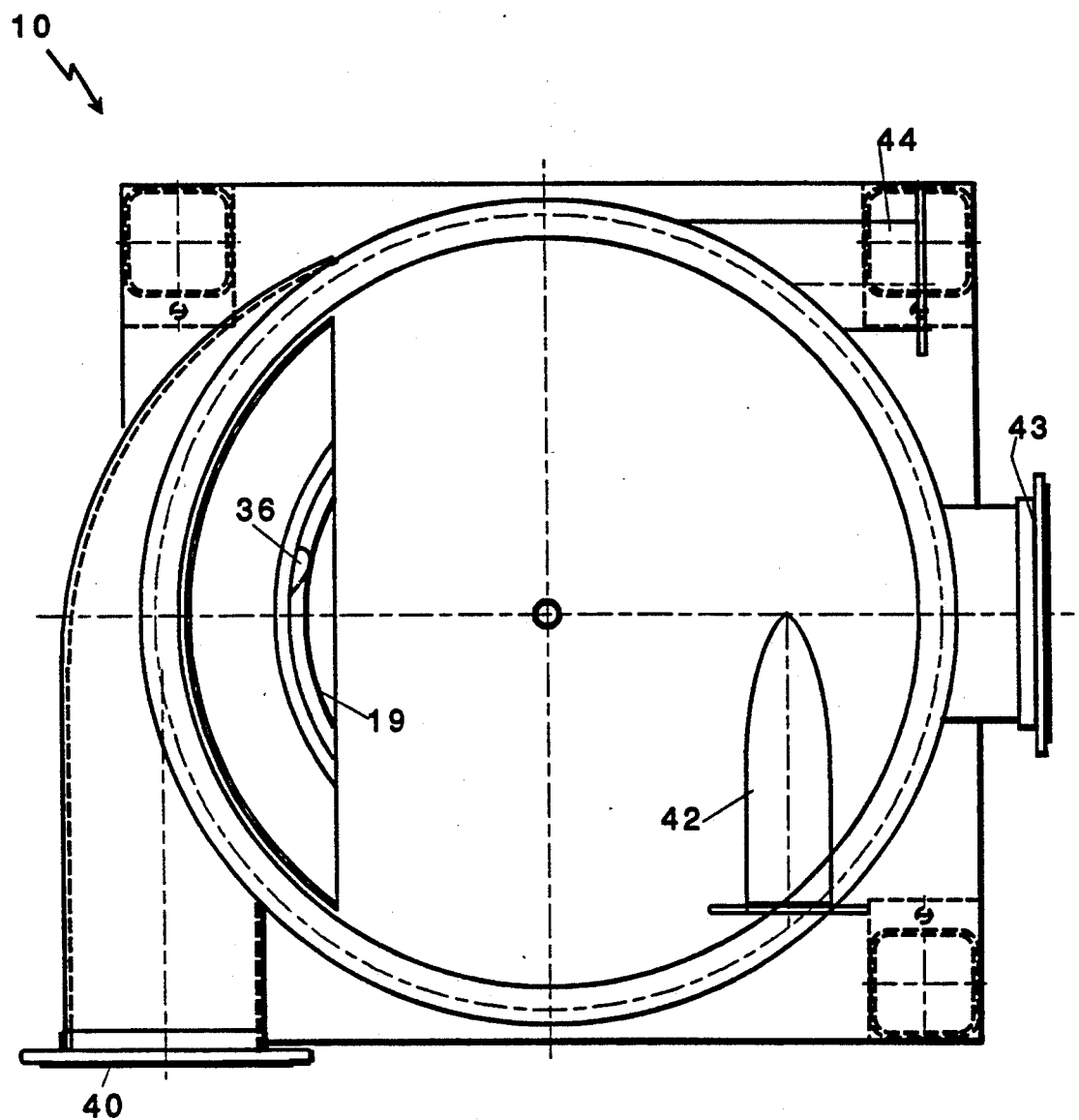
FIG. 2 is a cross-sectional top view of a portion of the screen apparatus taken along lines 2—2 of FIG. 1.

Referring to FIGS. 1 and 2, a screen apparatus 10 is shown having a housing 12 mounted on a base plate 14. Within housing 12 is a rigid support structure 16 for supporting a screen basket assembly 18 and a shaft assembly 20. Support structure 16 includes a cylindrical drum 22 rigidly attached to base plate 14 at the bottom portion of screen apparatus 10, a top plate 24 for mounting screen basket assembly 18 and a supporting seal assembly 26. Shaft assembly 20 includes a shaft 28 extending through base plate 14 and top plate 24 along a longitudinal axis 30 of housing 12 and support structure 16. Shaft 28 is secured at a bottom end to a grooved pulley 32 which is driven by a belt coupled to a drive motor (not shown). A hub 34 is attached to the top end of shaft 28 and extends radially outward to a point where hydrofoils 36 (pulley elements) extend down along and in close proximity to the outer surface of screen basket assembly 18. One example of a hydrofoil used to clear openings in a screen basket is described in U.S. Pat. No. 5,078,878, entitled "Pressure Knotter Screening Apparatus", assigned to the present assignee, and incorporated herein by reference. A removable cover 13 is attached to an open end portion 33 of housing 12 and includes a baffle 37. Baffle 37 is hemispherical in shape with a center apex portion 38 being proximately spaced from hub 34 at the top end of shaft 28 and portions of increasing radius being gradually spaced at an increasing distance from rotor assembly 20. Baffle 37 forces air and light rejected material away from the rotation axis 30 of rotor assembly 20 and towards the outer walls of housing 12.

In operation, fluid pulp is introduced under pressure to a fluid chamber 41 of screen apparatus 10 through a feed inlet 40 positioned along the outer periphery of housing 12 so that the fluid pulp circulates along the outer radial portion of housing 12. A spinning action is placed on the circulating fluid pulp by the circular cross sectional shape of housing 12 and the rotational motion of hub 34 and hydrofoils 36 which circulates in the same direction as the entering fluid pulp. The spinning action causes a separation of material due to their specific gravity such that lighter materials gravitate toward longitudinal axis 30 and heavier materials collect along the outer radial portion of housing 12. Lighter materials and small heavier materials that are desired to be removed from apparatus 10 exit through light reject outlet 42 positioned at the open end portion 33 of housing 12. On the other hand, larger, heavier materials, (e.g. metallic rejectables), are removed through a heavy reject outlet 44 located below open end portion 33 of housing 12. Acceptable fluid pulp that has been screened is removed from apparatus 10 through accept outlet 43 for further processing (FIG. 2).

The rejected material continues past screen basket 19 and into a reject chamber 39, (in this case, open end portion 33) where it is removed through reject outlet 42. Because of its proximity to hub 34 and hydrofoils 36, the rejected fluid pulp is under a spinning motion about axis 30 of screening apparatus 10. Light rejectable material and air collect at axis 30 of screening apparatus 10. Baffle 37 forces air and light rejectable material away from axis 30 and towards the outer walls of housing 12. With reject outlet 42 being located in a tangential position with its opening facing into the direction of the rotating fluid, the energy of the spinning liquid is employed to assist with the pumping of the rejected fluid pulp. This advantage becomes greater as the radial distance of reject outlet 42 is increased from axis 30 of screening apparatus 10. Reject outlet 42 is positioned along the outer walls of housing 12 because heavy rejectable materials of small size are more prevalent at this location. The lighter and smaller sized heavy rejectable materials along with the air are forced together in reject chamber 39 to be removed through reject outlet 42. The uppermost point of reject outlet 42 is shown to be at or above the uppermost point of baffle 37. This arrangement is advantageous since the air and light materials have a tendency to rise to the top of housing 12.

Figure 3:
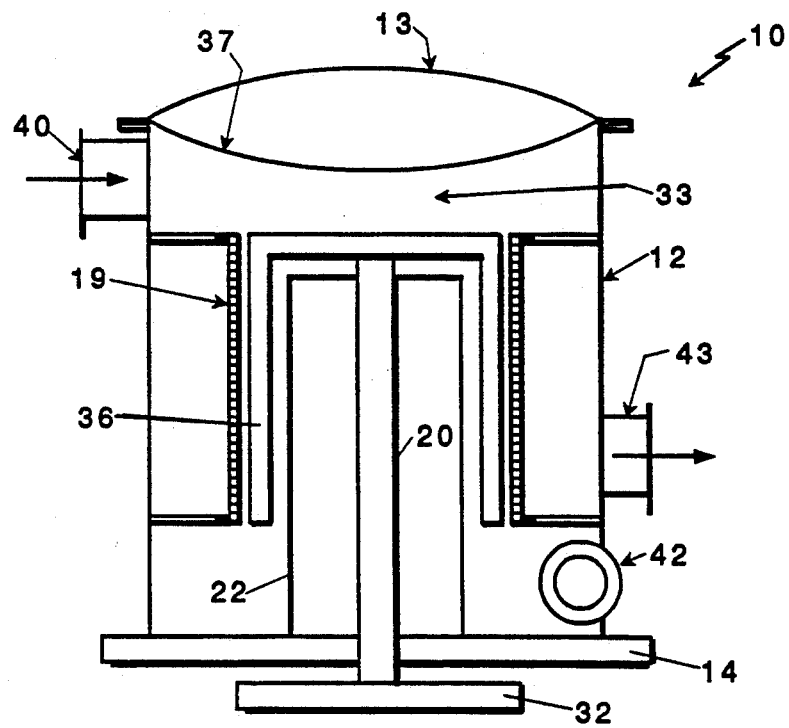
FIG. 3 is a diagrammatic side view of an alternate embodiment of the invention.
Figure 4:
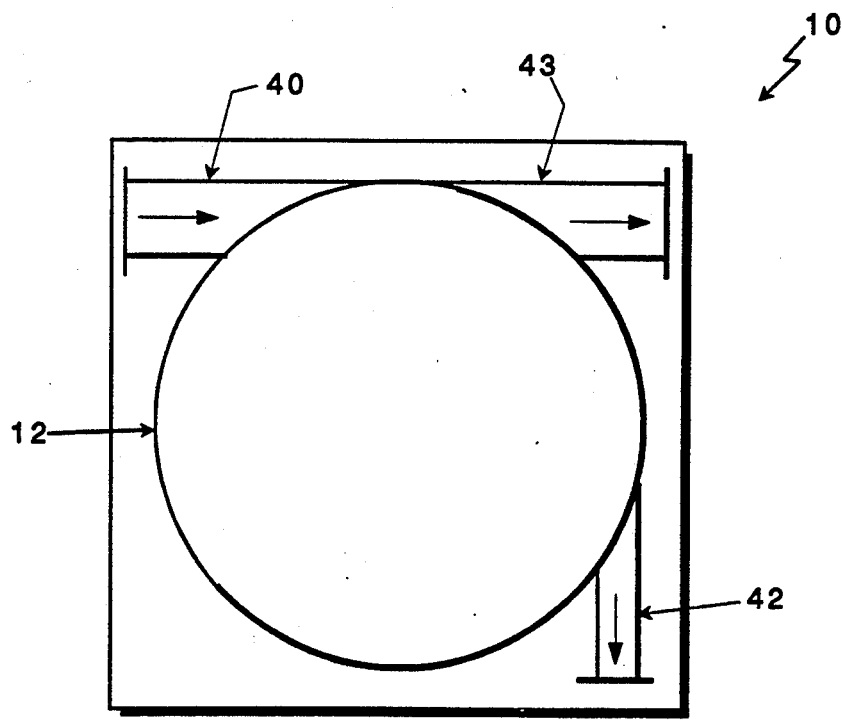
FIG. 4 is a diagrammatic top view of the alternate embodiment of FIG. 3.

Other embodiments are within the scope of the claims. For example, as shown in FIGS. 3 and 4, screening apparatus 10 has feed inlet 40 positioned at open end portion 33 of screening apparatus 10 proximate to baffle 37. Feed inlet 40 is located along an outer portion of housing 12 such that unscreened fluid pulp enters apparatus 10 tangentially (FIG. 4). Light rejectable material and air collect at axis 30 of screening apparatus 10. Baffle 37 forces air and light rejectable material away from axis 30 and towards the outer walls of housing 12 to be remixed with the main body of feed slurry. Accept outlet 43 and reject outlet 42 are similarly disposed along outer portions of housing 12 to remove acceptable and rejected material, respectively, from screening apparatus 10. In this arrangement, rejected material from the entering fluid pulp has been screened by screen basket 19 from which it passes by to reject outlet 42.

Figure 5:
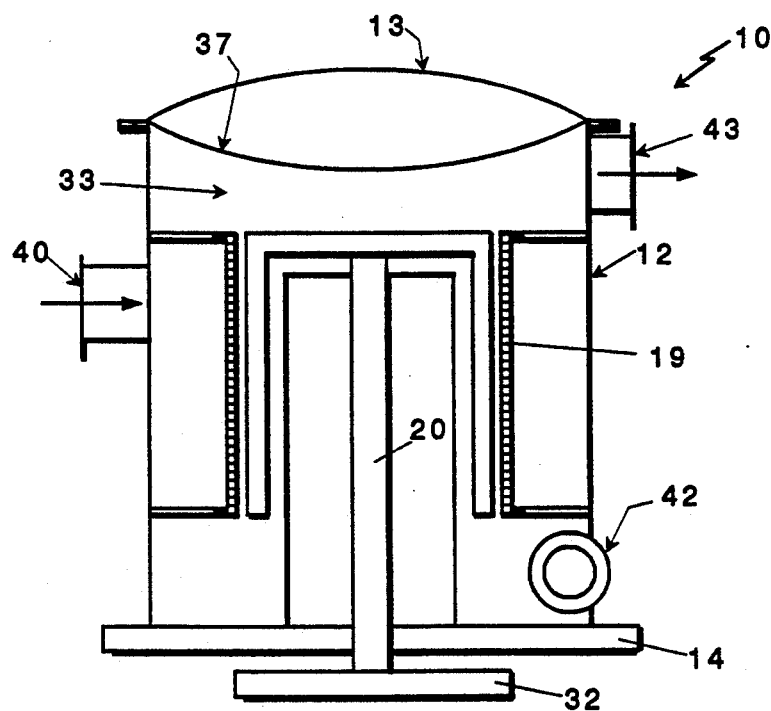
FIG. 5 is a diagrammatic side view of another alternate embodiment of the invention.
Figure 6:
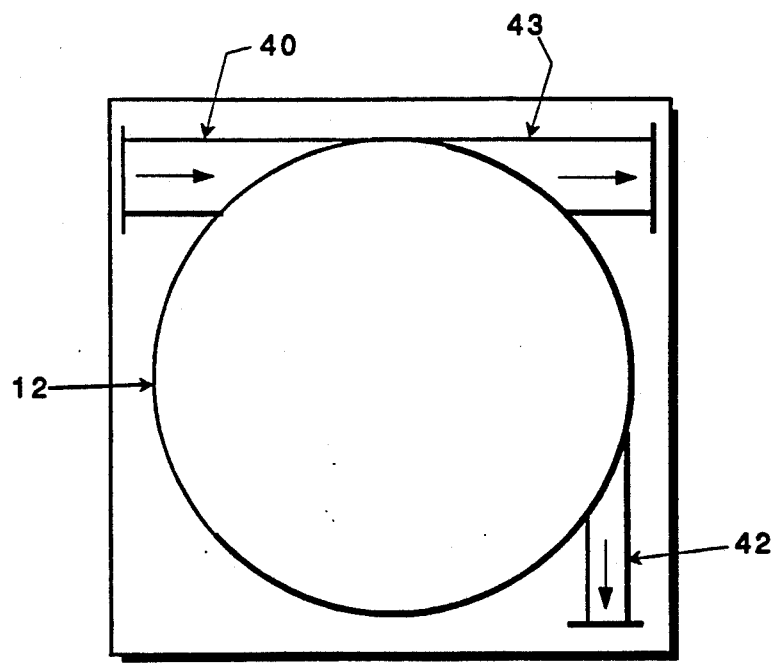
FIG. 6 is a diagrammatic top view of the alternate embodiment of FIG. 5.

Similarly, as shown in FIGS. 5 and 6, screening apparatus 10 may have accept outlet 43 positioned at open end portion 33 and nearest to baffle 37. Baffle 37, although equally effective in deflecting lighter materials and air to the more active outer regions of screening apparatus 10, is less essential in this configuration since a greater amount of rejectable material has already been screened by screen basket 19.

Figure 7:
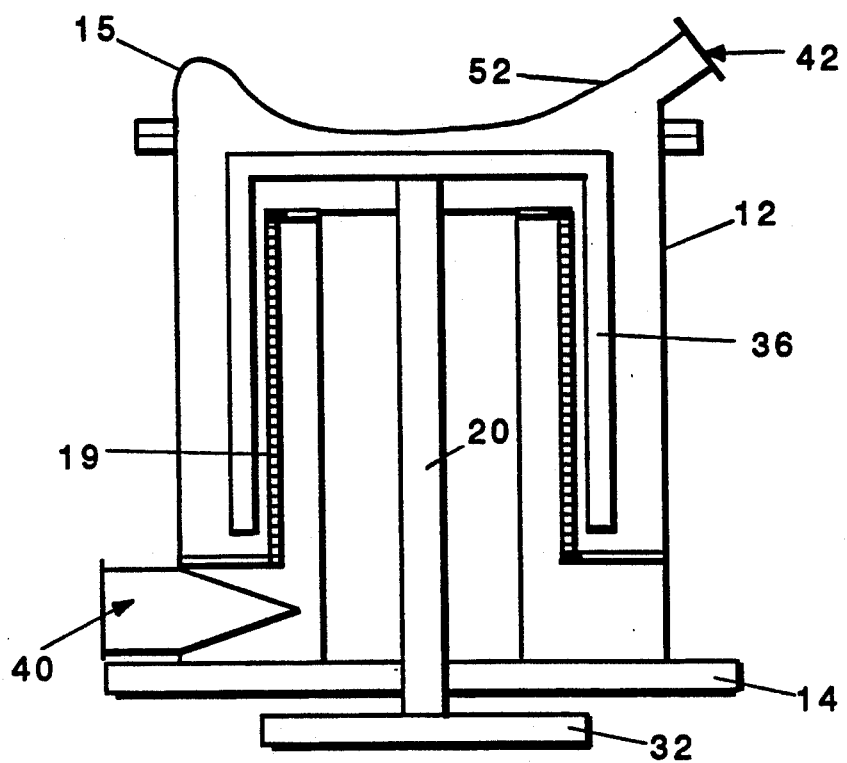
FIG. 7 is a diagrammatic side view of an alternate embodiment of FIG. 1.

Referring to FIG. 7, cover 15 for screening apparatus 10 is formed to incorporate the shape of baffle 37 of FIGS. 1, 3 and 5. Cover 15, used in conjunction with the embodiment of FIG. 1 would have reject outlet 42 located at a knuckle portion 52 to remove rejectable material. On the other hand, if used in conjunction with the embodiment of FIG. 5, accept outlet 43 is located at knuckle portion 52 to remove acceptable fluid pulp. Finally, if used in conjunction with the embodiment of FIG. 3, feed inlet 40 is located at knuckle portion 52 to introduce fluid pulp.

It is also appreciated that a number of baffles or deflecting elements may be used within the chamber to force air and lighter materials to the outer regions of the housing. Further, baffle 37 need not be symmetrically shaped or be aligned along the axis of rotation. Baffle 37 may also be used in conjunction with dilution inlet 50 (See FIG. 1) disposed at the axis of rotation to aid in the removing of air and light materials from the chamber.

What is claimed is:

1. A screening apparatus for separating acceptable and rejectable material from a pressurized stream of fluid pulp, comprising:
   a housing;
   a fluid inlet for conveying the pressurized stream of fluid pulp into an inlet chamber of the housing;
   an accept outlet for conveying the separated acceptable material from an accepts chamber of the screening apparatus;
   a reject outlet for conveying the separated rejectable material from a rejects chamber of the screening apparatus;
   a screen basket, supported within the housing and having an upper end portion, the screen basket providing a barrier to the fluid pulp moving between the inlet chamber and the accepts chamber, the screen basket having openings sized to separate the acceptable and rejectable material;
   a rotor, supported within the housing and having an axis of rotation disposed concentrically with respect to the screen basket, the rotor carrying on one surface one or more pulsing elements in close proximity to the screen basket, for clearing the openings of the rejectable material; and
   the rejects chamber being positioned proximate the upper end portion of the screen basket, the inlet chamber being positioned radially outside of the screen basket, and the accepts chamber being positioned radially inside of the screen basket so that fluid bearing acceptable material flows radially inwardly from the inlet chamber through the screen basket to the accepts chamber, and fluid bearing rejectable material flows axially from the inlet chamber along the outside of the screen basket to the rejects chamber, the rejects outlet being positioned at a radially outward location relative to the axis of rotation, the rejects chamber providing a fluid pulp path to the rejects outlet for the fluid bearing the rejectable material, the fluid pulp path within the rejects chamber having as its upper boundary an upwardly sloping surface that slopes upwardly with increasing radius relative to the axis of rotation, the upwardly sloping surface providing a path to deflect air and light materials radially away from the axis of rotation and to the rejects outlet at the radially outward location.

2. The screening apparatus of claim 1 wherein the upward slope of the upwardly sloping surface is continuous and uninterrupted by flat sections from the axis of rotation to the rejects outlet.

3. The screening apparatus of claim 1 wherein the flow path within the chamber has an axial spacing at a region along the axis of rotation that increases with increasing radius relative to the axis of rotation.

4. The screening apparatus of claim 2 wherein the rejects chamber is defined by an end portion of the housing and the end portion of the screen basket.

5. The screening apparatus of claim 4 wherein at least one of the housing and end portion of the screen basket has a hemispherical shape with an apex in the region of the axis of rotation, and the hemispherical shape provides the upwardly sloping surface.

6. The screening apparatus of claim 4 wherein the end portion of the housing comprises a baffle to deflect air and light materials radially away from the axis of rotation and to peripheral regions of the housing, and the baffle provides the upwardly sloping surface.

7. The screening apparatus of claim 1 wherein the screen basket is cylindrical in shape.

8. The screening apparatus of claim 1 wherein the housing is in an upright position.

9. A screening apparatus for separating acceptable and rejectable material from a pressurized stream of fluid pulp, comprising:

a housing;

a fluid inlet for conveying the pressurized stream of fluid pulp into an inlet chamber in the housing;

an accept outlet for conveying the separated acceptable material from an accepts chamber of the screening apparatus;

a reject outlet for conveying the separated rejectable material from a rejects chamber of the screening apparatus;

a screen basket, supported within the housing and having an end portion, the screen basket providing a barrier to the fluid pulp moving between the fluid inlet and the accept outlet, the screen basket having openings sized to separate the acceptable and rejectable material;

a rotor, supported within the housing and having an axis of rotation disposed concentrically with respect to the screen basket, the rotor carrying on one surface one or more pulsing elements in close proximity to the screen basket, for clearing the openings of the rejectable material; and the rejects chamber being proximate the end portion of the screen basket, the rejects outlet being located at a radially outward location of the rejects chamber, the rejects chamber providing a fluid pulp path, the fluid pulp path having an upper boundary defined by an upwardly sloping surface that slopes upwardly with increasing radius relative to the axis of rotation, the upwardly sloping surface being continuous and uninterrupted by flat sections from the axis of rotation to the rejects outlet to provide a path to deflect air and light materials radially away from the axis of rotation and to the rejects outlet at the radially outward location.

10. The screening apparatus of claim 9 wherein the upwardly sloping surface has a hemispherical shape with an apex in the region of the axis of rotation.

* * * * *